(12) United States Patent
Jeon et al.

(10) Patent No.: US 11,579,168 B2
(45) Date of Patent: Feb. 14, 2023

(54) PROBE FOR DETECTING NEAR FIELD AND NEAR-FIELD DETECTING SYSTEM INCLUDING THE SAME

(71) Applicant: SAMSUNG ELECTRONICS CO., LTD., Suwon-si (KR)

(72) Inventors: Ikseon Jeon, Suwon-si (KR); Namil Koo, Hwaseong-si (KR); Junbum Park, Goyang-si (KR); Inkeun Baek, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/488,657

(22) Filed: Sep. 29, 2021

(65) Prior Publication Data

US 2022/0155340 A1 May 19, 2022

(30) Foreign Application Priority Data

Nov. 16, 2020 (KR) .................... 10-2020-0152968

(51) Int. Cl.
  *G01Q 60/22* (2010.01)
  *G01Q 20/02* (2010.01)
(52) U.S. Cl.
  CPC ............ *G01Q 60/22* (2013.01); *G01Q 20/02* (2013.01)
(58) Field of Classification Search
  CPC ................................ G01Q 60/22; G01Q 20/02
  USPC ........................................................ 850/32
  See application file for complete search history.

(56) References Cited

U.S. PATENT DOCUMENTS

| 5,519,686 | A | * | 5/1996 | Yanagisawa | ......... G11B 9/1418 977/851 |
| 7,193,424 | B2 | | 3/2007 | Chang | |
| 7,250,598 | B2 | | 7/2007 | Hollingsworth et al. | |
| 7,319,528 | B2 | | 1/2008 | Hidaka | |
| 7,449,688 | B2 | | 11/2008 | Lewis | |
| 9,395,388 | B2 | | 7/2016 | Wu et al. | |
| 9,606,052 | B2 | | 3/2017 | Han et al. | |

(Continued)

FOREIGN PATENT DOCUMENTS

| EP | 0 864 899 B1 | 8/2003 |
| JP | 2004-101378 A | 4/2004 |

(Continued)

*Primary Examiner* — Nicole M Ippolito
(74) *Attorney, Agent, or Firm* — Sughrue Mion, PLLC

(57) ABSTRACT

Provided is a probe configured to detect a near field, the probe including a probe substrate having a tip region at an end portion of the probe substrate, a width of the tip region being less than a width of a remaining region of the probe substrate, a first electrode and a second electrode disposed on a surface of the probe substrate, the first electrode and the second electrode being spaced apart from each other and extending from the tip region along the probe substrate, an emitter and a detector disposed between the first electrode and the second electrode, the emitter and the detector being spaced apart from each other in a direction in which the probe substrate extends, and being configured to be photo switched, and a reflector disposed above the emitter and the detector in the direction in which the probe substrate extends opposite to the tip region, and configured to reflect an electromagnetic wave emitted from the emitter.

20 Claims, 9 Drawing Sheets

(56) References Cited

U.S. PATENT DOCUMENTS

| | | | | |
|---|---|---|---|---|
| 2003/0076122 | A1* | 4/2003 | Wilsher | G01R 19/00 |
| | | | | 324/754.06 |
| 2005/0212529 | A1* | 9/2005 | Huang | G01Q 30/06 |
| | | | | 324/633 |
| 2016/0231351 | A1 | 8/2016 | Lee et al. | |
| 2021/0318352 | A1* | 10/2021 | Martinez Orellana | |
| | | | | G01Q 60/08 |
| 2022/0042917 | A1* | 2/2022 | Liu | G01Q 60/06 |
| 2022/0209038 | A1* | 6/2022 | Gusken | H01L 31/02019 |

FOREIGN PATENT DOCUMENTS

| KR | 1998-080196 A | 11/1998 |
|---|---|---|
| KR | 10-1274030 B1 | 6/2013 |
| KR | 10-1507108 B1 | 3/2015 |
| KR | 10-1718900 B1 | 3/2017 |

* cited by examiner

PROBE FOR DETECTING NEAR FIELD AND NEAR-FIELD DETECTING SYSTEM INCLUDING THE SAME

CROSS-REFERENCE TO THE RELATED APPLICATION

This application claims priority to Korean Patent Application No. 10-2020-0152968 filed on Nov. 16, 2020 in the Korean Intellectual Property Office, the disclosure of which is incorporated herein by reference in its entirety.

BACKGROUND

1. Field

Example embodiments of the present disclosure relate to a probe for detecting a near field and a near-field detecting system including the same.

2. Description of Related Art

With the trend for the advancement, integration, and miniaturization of technology, demands for high sensitivity and high spatial resolution in various measuring devices are increasing. In a far-field system such as far-field optical microscopy, the shorter the wavelength of light, the higher the resolution. However, there is a limitation in that the resolution thereof cannot be improved below a wavelength due to the diffraction of light. The limitation of the far-field system caused by the wavelength can be overcome in a near-field system, so that a high-resolution measuring device and an ultra-high-density recording device can be manufactured.

SUMMARY

One or more example embodiments provide a probe for detecting a near field, having improved precision of a measurement position, and a near-field detecting system including the same.

According to an aspect of an example embodiment, there is provided a probe configured to detect a near field, the probe including a probe substrate having a tip region at an end portion of the probe substrate, a width of the tip region being less than a width of a remaining region of the probe substrate, a first electrode and a second electrode disposed on a surface of the probe substrate, the first electrode and the second electrode being spaced apart from each other and extending from the tip region along the probe substrate, an emitter and a detector disposed between the first electrode and the second electrode, the emitter and the detector being spaced apart from each other in a direction in which the probe substrate extends, and being configured to be photo switched, and a reflector disposed above the emitter and the detector in the direction in which the probe substrate extends opposite to the tip region, and configured to reflect an electromagnetic wave emitted from the emitter.

According to another aspect of an example embodiment, there is provided a near-field detecting system including a probe configured to emit an electromagnetic wave to an analysis sample and to detect a near field reflected from the analysis sample, a spectroscope connected to the probe and configured to measure an electromagnetic wave detected by the probe, an image generation device disposed on a side of the probe and configured to image the probe and the analysis sample, at least one processor configured to implement an analyzer connected to the spectroscope and the image generation device and configured to analyze information provided from the spectroscope and information provided from the image generation device, and a controller configured to adjust a position of the analysis sample based on a control signal from the analyzer, and a laser source configured to radiate a laser to the probe, wherein the probe includes a probe substrate, a detector and an emitter sequentially disposed from a lower portion of the probe substrate in a direction in which the probe substrate extends, the detector and the emitter being configured to be photo switched, and a reflector disposed above the emitter in the direction in which the probe substrate extends, and configured to reflect an electromagnetic wave emitted from the emitter.

According to an aspect of an example embodiment, there is provided a near-field detecting system including a probe configured to emit an electromagnetic wave to an analysis sample and to detect a near field reflected from the analysis sample, a spectroscope connected to the probe and configured to measure an electromagnetic wave detected by the probe, an image generation device disposed on a side of the probe and configured to image the probe and the analysis sample, at least one processor configured to implement an analyzer connected to the spectroscope and configured to analyze information from the spectroscope, and a controller configured to adjust a position of the analysis sample based on a control signal from the analyzer, and a laser source configured to radiate a laser to the probe, wherein the probe includes a probe substrate, a detector and an emitter sequentially disposed from a lower portion of the probe substrate in a direction in which the probe substrate extends, the detector and the emitter being configured to be photo switched, and a reflector disposed above the emitter in the direction in which the probe substrate extends, and configured to reflect an electromagnetic wave emitted from the emitter.

BRIEF DESCRIPTION OF DRAWINGS

The above and/or other aspects, features, and advantages of example embodiments will be more clearly understood from the following detailed description, taken in conjunction with the accompanying drawings, in which.

DETAILED DESCRIPTION

Hereinafter, example embodiments will be described with reference to the accompanying drawings.

Figure 1:
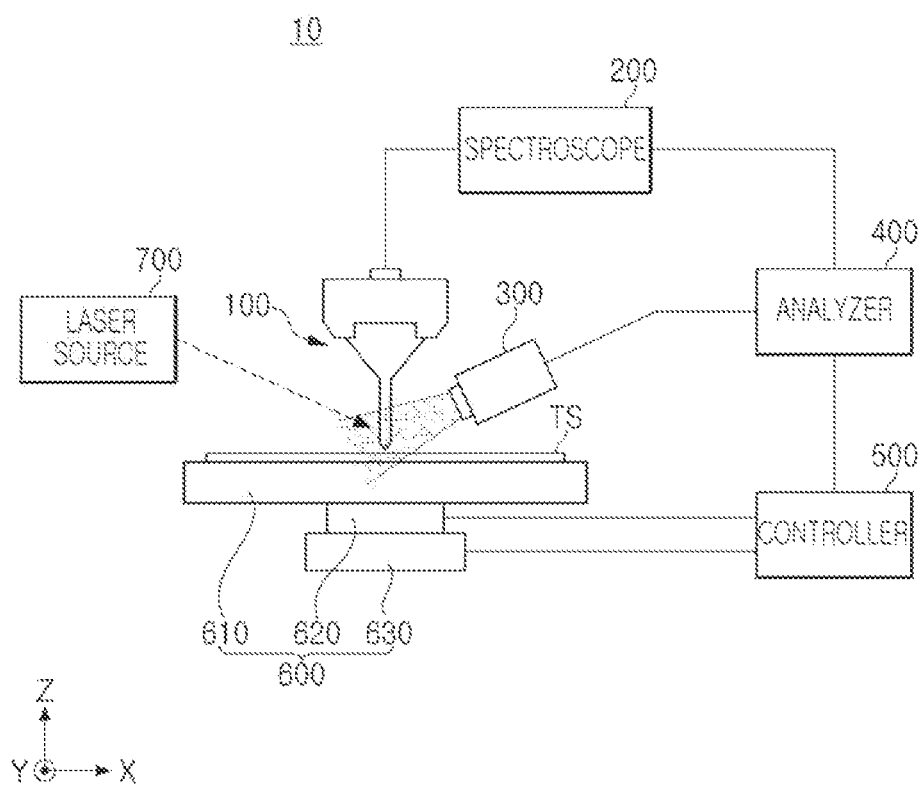
FIG. 1 is a schematic diagram illustrating a near-field detecting system according to example embodiments.

FIG. 1 is a schematic diagram illustrating a near-field detecting system according to example embodiments.

Referring to FIG. 1, a near-field detecting system 10 may include a probe 100 emitting an electromagnetic wave to an analysis sample TS and detecting a near field reflected from the analysis sample TS, a spectroscope 200 connected to the probe 100 to measure the electromagnetic wave detected by the probe 100, an image generation device 300 disposed on one side of the probe 100 and imaging the probe 100 and the analysis sample TS, and an analyzer 400 connected to the spectroscope 200 and the image generation device 300 to analyze information therefrom, and a controller 500 adjusting a position of the analysis sample TS depending on a control signal from the analyzer 400. The near-field detecting system 10 may further include a stage 600, on which an analysis sample TS is placed, and a laser source 700 oscillating a laser with the probe 100. The near-field detecting system 10 may be an analysis system outputting an electric field from the probe 100 and analyzing the analysis sample TS using the electric field. For example, the near-field detecting system 10 may be a reflective near-field measurement system.

The probe 100 may be disposed above an analysis sample TS, for example, a semiconductor chip or a wafer, to emit an electromagnetic wave to the analysis sample TS and to detect an electromagnetic wave reflected and returning from the analysis sample TS. In the present specification, the probe 100 may be referred to as a probe for detecting a nearfield or may be simply referred to as a probe. The probe 100 may be photo switched by a laser from the laser source 700 to emit and detect an electromagnetic wave. The probe 100 may be disposed to be close to a surface of the analysis sample TS to analyze the analysis sample TS. The probe 100 according to the example embodiment may be controlled to be disposed above the analysis sample TS and to be close to the analysis sample TS in the range of about 2 μm or less, for example, about 10 nm to about 1 μm.

The probe 100 may include an electrode, an emitter, a detector, and a reflector. A structure of the probe 100 will be described in more detail later with reference to FIGS. 2A and 2B. The probe 100 may adjust a distance to the analysis sample TS, for example, a distance in a direction perpendicular to the surface of the analysis sample TS using the reflector. This will be described in more detail later with reference to FIGS. 3A to 4B.

The spectroscope 200 may measure a detected electromagnetic wave from the probe 100. For example, an electromagnetic wave detected by the probe 100 may be converted into a current, and the spectroscope 200 may detects the current flowing along an electrode of the probe 100 to quantify the magnitude of the electromagnetic wave.

The image generation device 300 may image the probe 100 and the analysis sample TS together to generate and store an image. The image generation device 300 may image the surface of the analysis sample TS at a tilted angle. The image generation device 300 may image, for example, an irregular pattern and/or a scribe line for cutting a semiconductor chip present on the surface of the analysis sample TS. The image generation device 300 may capture an image of the analysis sample TS to adjust a relative location of the probe 100 on a plane parallel to the surface of the analysis sample TS. This will be described in more detail later with reference to FIGS. 5 and 6.

The image generation device 300 may include at least one camera that includes a complementary metal oxide semiconductor (CMOS) image sensor or a charge-coupled device (CCD) image sensor, not being limited thereto. According to example embodiments, the image generation device 300 may include a plurality of cameras. In this case, the plurality of cameras may image the probe 100 and the analysis sample TS in a plurality of positions. However, the image generation device 300 may not image the probe 100 and the analysis sample TS together.

The analyzer 400 may be connected to the spectroscope 200 and the image generation device 300 to analyze information therefrom and to control a position of the stage 600 and a position of the analysis sample TS, depending on the position of the stage 600, through the controller 500. For example, the analyzer 400 may analyze physical properties, surface properties, and the like of the analysis sample TS, based on information from the spectroscope 200. To this end, the analyzer 400 may include an analog-to-digital converter. In addition, the analyzer 400 may analyze a vertical distance between the probe 100 and the analysis sample TS, for example, a distance in a Z direction (a first direction), based on the information from the spectroscope 200. The analyzer 400 may analyze a relative location of the probe 100 and the analysis sample TS, for example, a position of the probe 100 in an X direction (second direction) and an Y direction (a third direction), based on the information from the image generation device 300. The analyzer 400 may transmit a control signal to the controller 500 based on the analyzed information.

The analyzer 400 may be, for example, a computing system including a workstation. According to example embodiments, the analyzer 400 may be integrated with the spectroscope 200. The analyzer 400 may include or may be implemented by at least one processor such as a central processing unit (CPU) that performs the respective functions, a microprocessor, or the like.

The controller 500 may control a physical movement of the stage 600. The controller 500 may adjust the position of the analysis sample TS, depending on the control signal from the analyzer 400. For example, the controller 500 may include or may be implemented by at least one processor such as a central processing unit (CPU) that performs the respective functions, a microprocessor, or the like. This at least one processor may be the same processor included in or implementing the analyzer 400, in which case the analyzer 400 and the controller 500 may constitute one single component of the near-field detecting system 10, according to an example embodiment.

The stage 600 may include a support unit 610 on which an analysis sample TS is placed, a vertical position adjustment unit 620 adjusting a position of the support unit 610 in the Z direction, and a horizontal position adjustment unit 630 adjusting a position of the support unit 610 in the X direction and the Y direction. The support unit 610 may attach the analysis sample TS by vacuum, as a vacuum chuck, and then may support the attached analysis sample TS. However, embodiments are not limited thereto. For example, the support unit 610 may attach the analysis sample TS by static electricity, and then may support the attached analysis sample TS. Each of the vertical position adjustment unit 620 and the horizontal position adjustment unit 630 may move the support unit 610 to adjust a position of the analysis sample TS disposed thereon.

The laser source 700 may radiate a laser to the probe 100, and the emitter and the detector of the probe 100 may be switched by the laser radiated to the probe 100. The laser source 700 may oscillate a pulsed laser, and may radiate, for example, a femtosecond laser to the probe 100. According to example embodiments, the laser source 700 may further include at least one of a beam splitter, a mirror, and a retarder, separate from a laser oscillator. In example embodiments, the laser source 700 may include a plurality of laser oscillators for radiating a laser to each of the emitter and the detector of the probe 100.

Figure 2A:
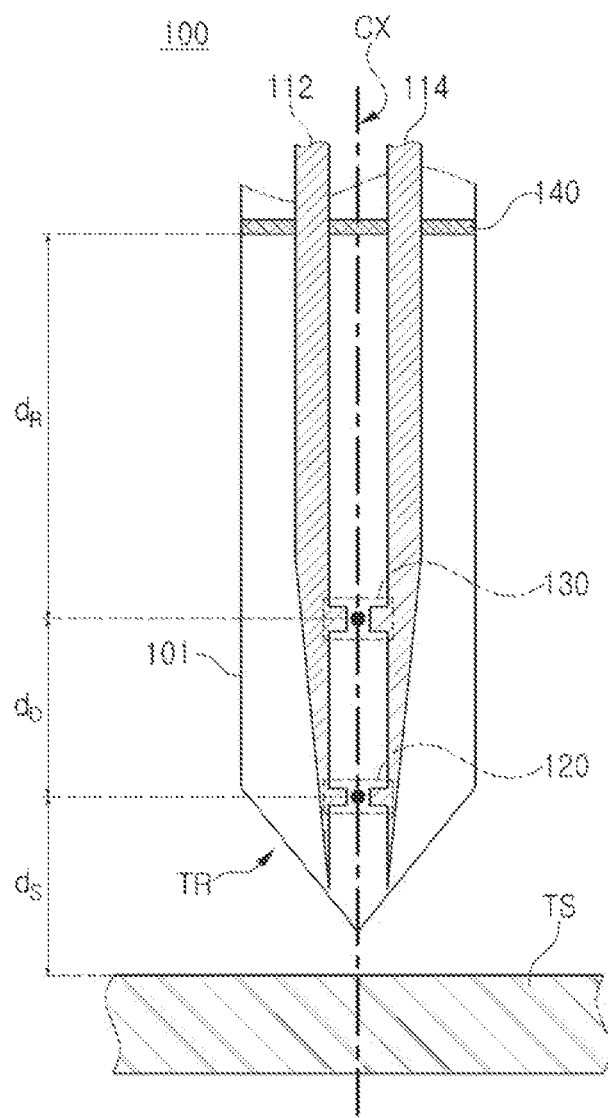
FIGS. 2A and 2B are schematic diagrams illustrating a probe for detecting a near field according to example embodiments.
Figure 2B:
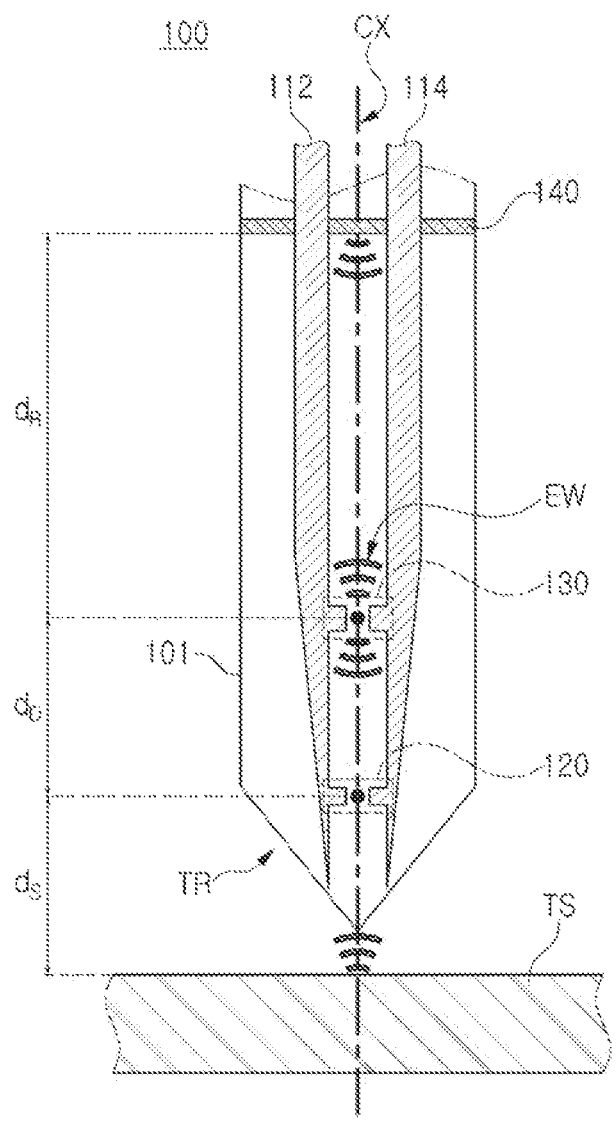

FIGS. 2A and 2B are schematic diagrams illustrating a probe for detecting a near field according to example embodiments. FIG. 2A is a front view of a probe for detecting a near field, and FIG. 2B is a diagram illustrating an electromagnetic wave EW added in FIG. 2A.

Referring to FIGS. 2A and 2B, a portion including a tip region TR on a lower end of a probe 100 is illustrated. The probe 100 may include a probe substrate 101 having a tip region TR having a reduced width in an end portion thereof, first electrode 112 and second electrode 114 disposed on one surface of the probe substrate 101, a detector 120 and an emitter 130 disposed between the first and second electrodes 112 and 114 to be vertically spaced apart from each other, and a reflector 140 disposed above the emitter 130.

The probe substrate 101 may have a vertically extending shape. However, an extension length, a shape, and the like of the probe substrate 101 may vary according to embodiments. In the probe substrate 101, the tip region TR may be disposed adjacent to the analysis sample TS. The probe substrate 101 may be connected to an additional holding unit on an upper end, and may be connected to the spectroscope 200 (see FIG. 1) through a connector, or the like, in the holding unit.

The probe substrate 101 may include a material reacting to a laser radiated from the laser source 700 (see FIG. 1). The probe substrate 101 may include a semiconductor material, for example, a group IV semiconductor, a group III-V compound semiconductor, or a group II-VI compound semiconductor. For example, the probe substrate 101 may include at least one of gallium arsenide (GaAs), indium gallium arsenide (InGaAs), aluminum gallium arsenide (AlGaAs), indium aluminum gallium arsenide (InAlGaAs), gallium nitride (GaN), aluminum gallium nitride (AlGaN), indium gallium nitride (InGaN), and indium aluminum gallium nitride (InAlGaN). For example, the probe substrate 101 may include low-temperature-grown gallium arsenide (LT-GaAs). The probe substrate 101 may include the above-described materials in a region including at least the tip region TR.

The first and second electrodes 112 and 114 may be disposed on one surface of the probe substrate 101 to extend along the probe substrate 101 to be connected to an additional circuit pattern. The first and second electrodes 112 and 114 may extend in the form of two lines spaced apart from each other. Each of the first and second electrodes 112 and 114 may have a shape in which a width increases while extending upwardly from a lower end along the probe substrate 101. However, embodiments are not limited thereto, and a pattern shape of the first and second electrodes 112 and 114 may vary according to embodiments. The first and second electrodes 112 and 114 may include a conductive material, for example, a metal material such as at least one of gold (Au), silver (Ag), copper (Cu), aluminum (Al), and platinum (Pt). In example embodiments, a light-transmitting insulating layer may be further disposed on the front surface of the probe substrate 101 to cover the first and second electrodes 112 and 114.

The detector 120 and the emitter 130 may be positioned to be sequentially spaced apart from a lower end of the probe substrate 101. Both the detector 120 and the emitter 130 may be vertically disposed on a central axis CX passing through the center of the probe 100. The detector 120 and the emitter 130 may include a laser irradiation region disposed between the first and second electrodes 112 and 114, as indicated by black dots of FIG. 2A. The detector 120 and the emitter 130 may be photo switched by a laser radiated from the laser source 700 to the laser irradiation region. The detector 120 and the emitter 130 may further include regions in which the first and second electrodes 112 and 114 protrude toward the laser irradiation region.

The emitter 130 may emit an electromagnetic wave by the photo switching. The emitter 130 may have a dipole electrode, so that an electromagnetic wave EW from the emitter 130 may be emitted in at least a vertical direction, as illustrated in FIG. 2B.

The detector 120 may detect an electromagnetic wave by the photo switching. The detector 120 may detect an electromagnetic wave EW emitted from the emitter 130 to be reflected by the analysis sample TS, and an electromagnetic wave EW emitted from the emitter 130 to be reflected by the reflector 140.

The reflector 140 may reflect an electromagnetic wave EW, emitted from the emitter 130 to be transmitted in an upward direction, in a downward direction. The reflector 140 may be configured to measure a distance between the analysis sample TS and the probe 100, for example, a distance between the analysis sample TS and the detector 120. The reflector 140 may be disposed on the central axis CX above the detector 120 and the emitter 130 in the same manner as the detector 120 and the emitter 130. For example, the detector 120, the emitter 130, and the reflector 140 may disposed on the same axis, and may be disposed on the same axis as an analysis region of the analysis sample TS. For example, the axis may be in a direction, perpendicular to a surface of the analysis sample TS. The axis may be in a direction in which the probe substrate 101 extends.

The reflector 140 may be disposed in a direction intersecting the central axis CX on the surface of the probe substrate 101, for example, in a direction perpendicular to the central axis CX. The reflector 140 may be disposed to have a predetermined thickness in a region, other than a region in which the first and second electrodes 112 and 114 are disposed. The reflector 140 may be disposed as a layer having a predetermined thickness on the probe substrate 101, or may have a region in which a region of the probe substrate 101 is replaced with a material having a different refractive index. In the latter case, the reflector 140 may be formed by removing a portion of the probe substrate 101 and filling the removed portion with another material, or by doping a portion of the probe substrate 101. The reflector 140 may include a material having a refractive index different from a refractive index of the probe substrate 101. The reflector 140 may include a metal material, and may include at least one of, for example, gold (Au), silver (Ag), copper (Cu), aluminum (Al), and platinum (Pt). However, embodiments are not limited thereto. For example, the reflector 140 may include at least one of a polymer such as polyethylene terephthalate (PET), sapphire, quartz, fused silica, germanium (Ge), and silicon (Si). The reflector 140 may be configured to be electrically separated from the first and second electrodes 112 and 114 by, for example, an insulating layer or a gap.

The reflector 140 may be disposed above the emitter 130 such that a signal, detected after reflecting an electromagnetic wave from the emitter 130 from the surface of the analysis sample TS, and a signal, detected after reflecting the electromagnetic wave from the emitter 130 by the reflector 140, do not overlap each other. Accordingly, a distance $d_R$ between the reflector 140 and the emitter 130 may be greater than a distance $d_D$ between the emitter 130 and the detector 120. According to an example embodiment, a distance between the probe 100 and the analysis sample TS may be measured using the reflector 140, so that a distance $d_S$ between the detector 120 and the analysis sample TS and a distance between a lower end portion of the probe 100 and the analysis sample TS may be significantly reduced.

Figure 3A:
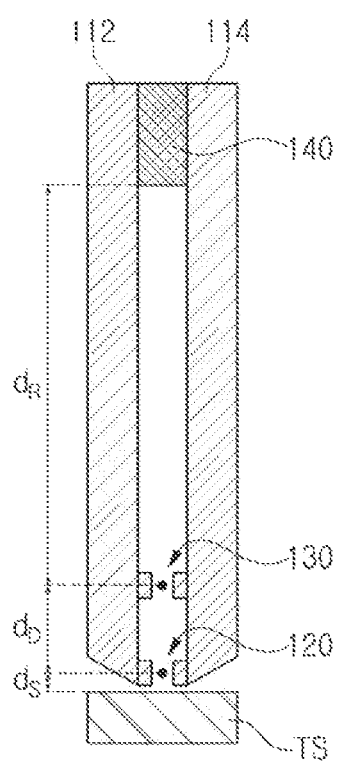
FIGS. 3A, 3B, and 3C are diagrams illustrating a method of measuring a distance using a probe for detecting a near field according to example embodiments.
Figure 3B:
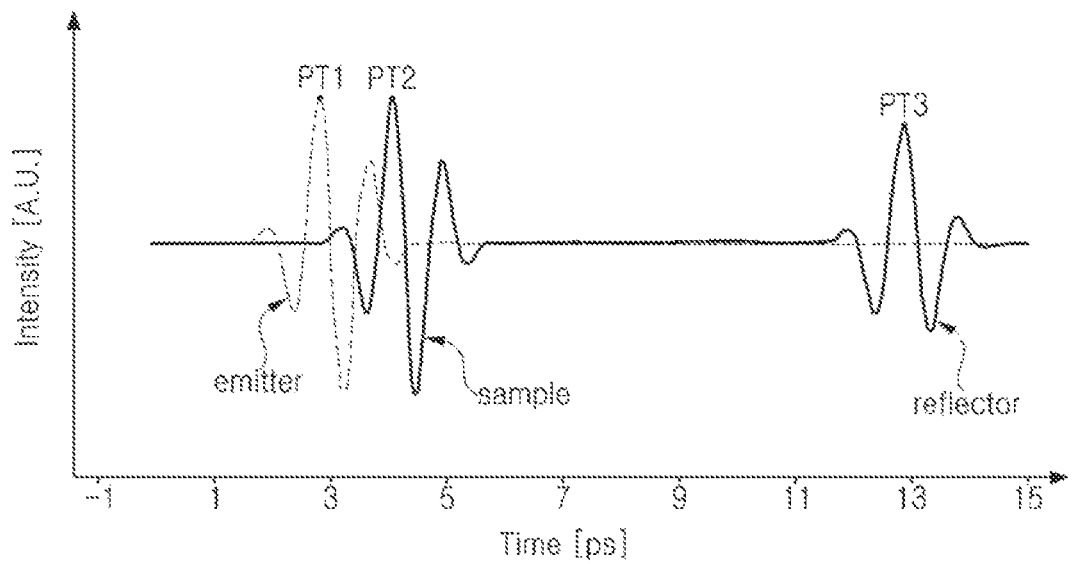
Figure 3C:
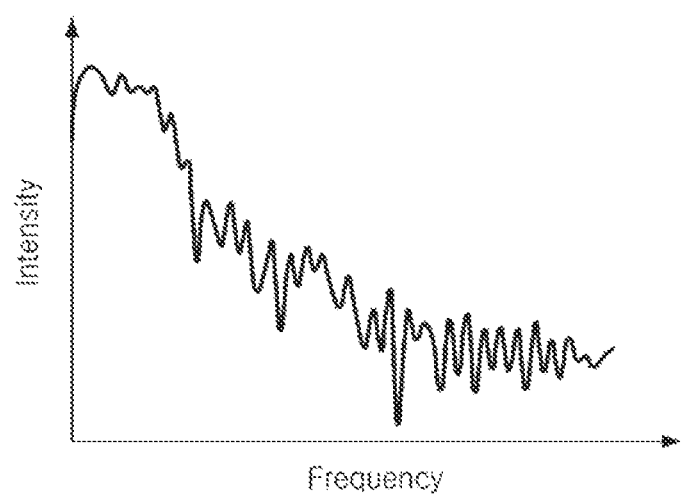

FIGS. 3A to 3C are diagrams illustrating a method of measuring a distance using a probe for detecting a near field according to example embodiments.

FIG. 3A illustrates a geometry of the probe 100 used in a simulation, and FIG. 3B is a graph illustrating an electromagnetic wave signal based on the simulation in a time domain. FIG. 3C is an exemplary graph illustrating an electromagnetic wave signal in a frequency domain.

Referring to FIGS. 3A and 3B, a signal emitted from the emitter 130 to be reflected from the surface of the analysis sample TS may have a second peak time PT2, and a signal emitted from the emitter 130 to be reflected by the reflector 140 may have a third peak time PT3.

A first peak time PT1 is a peak time for a signal emitted from the emitter 130, and may be calculated from Equation 1, as shown below.

$$Pt1 = Pt3 - (2d_R + d_D)/c \qquad \text{Equation 1}$$

Here, $d_R$ is a distance between the emitter 130 and the reflector 140, $d_D$ is a distance between the emitter 130 and the detector 120, and c is the speed of light.

A distance $d_S$ between the detector 120 and the analysis sample TS may be calculated from Equation 2 using the calculated first peak time PT1, as shown below.

$$2(d_S + d_D) = c \times (Pt2 - Pt1)$$

$$d_S = \{c(Pt2 - Pt1) - d_D\}/2 \qquad \text{Equation 2}$$

The distance $d_S$ between the detector 120 and the sample for analysis TS may be calculated by such a series of algorithms. Such calculations may be performed by, for example, the above-described analyzer 400 (see FIG. 1).

Referring to FIG. 3C, an electromagnetic wave signal may be analyzed in a frequency domain to analyze desired physical properties of the analysis sample TS. Therefore, according to the probe 100 of the example embodiment, a distance to the analysis sample TS may be measured through analysis in the time domain while measuring physical properties of the analysis sample TS using an electromagnetic wave emitted from the emitter 130 of the probe 100. The probe 100 of the example embodiment may further perform a distance sensing function as well as original functions of the near-field detecting system. The probe 100 of the example embodiment may more efficiently perform the distance sensing function using the reflector 140 without an additional operation of the probe 100. The near-field detecting system of the example embodiment may significantly reduce a measurement error, as compared with the case in which there is an additional distance sensor which is not disposed on the same axis as a measurement position of the probe 100.

Figure 4A:
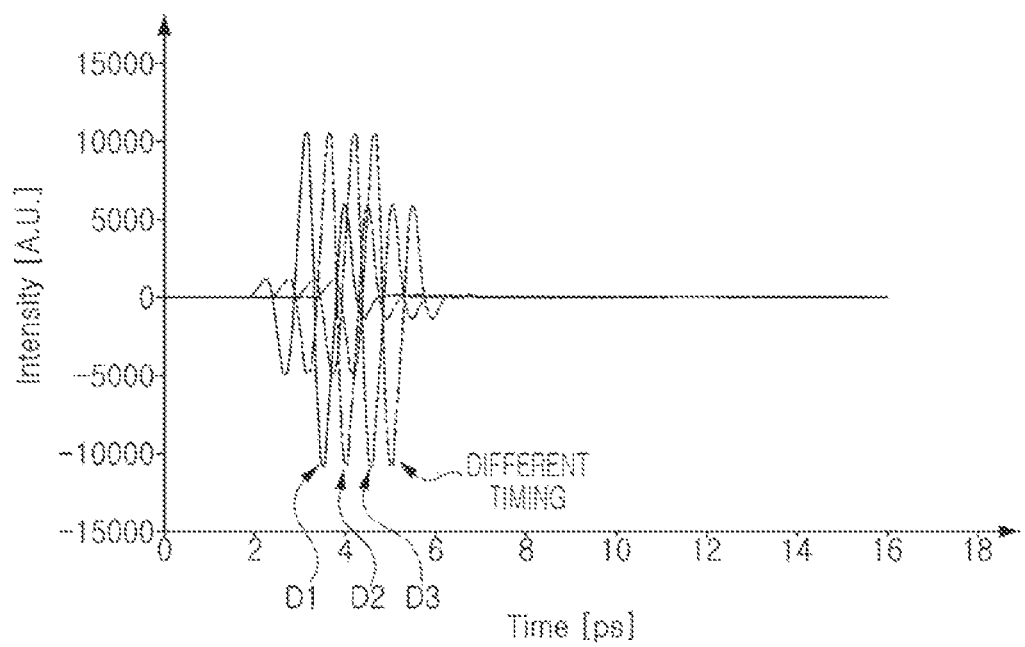
FIGS. 4A and 4B are diagrams illustrating a method of measuring a distance using a probe for detecting a near field according to example embodiments.
Figure 4B:
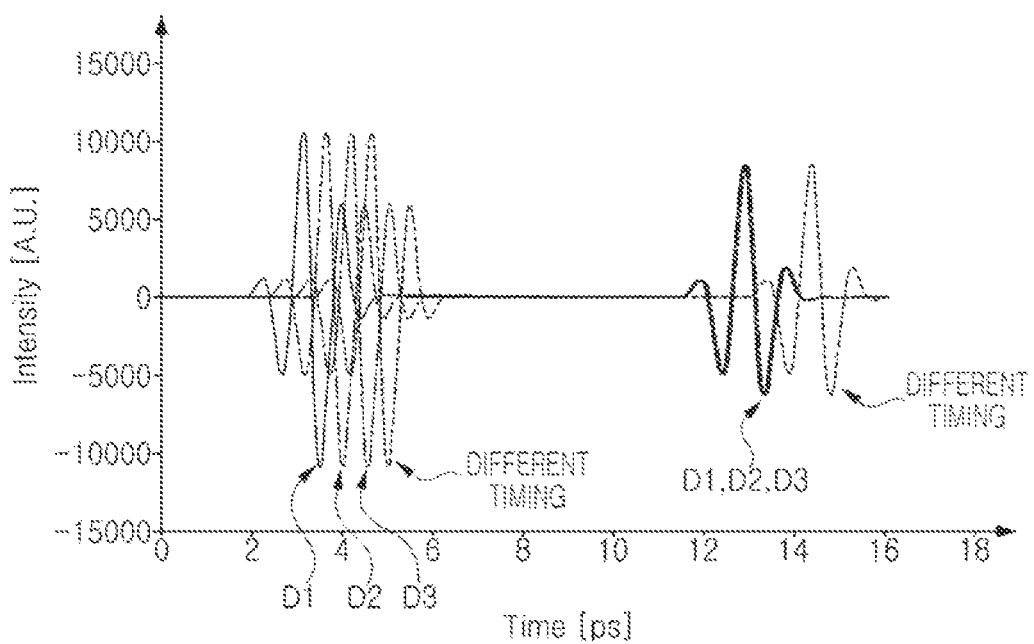

FIGS. 4A and 4B are diagrams illustrating a method of measuring a distance using a probe for detecting a near field according to example embodiments. FIG. 4A illustrates a simulation result in a related example in which the reflector 140 is not provided in a near-field detecting system, and FIG. 4B illustrates a simulation result in an example in which the reflector 140 is provided in a near-field detecting system according to an example embodiment.

In FIGS. 4A and 4B, four graphs indicate, in an order from left to right, an electromagnetic signal in the case in which distances D1, D2, and D3 between a probe 100 and an analysis sample TS are 2 μm, 4 μm, and 7 μm respectively (hereinafter referred to as "Case1"), and an electromagnetic signal in the case in which a timing of electromagnetic wave emission from an emitter 130 is different from that in Case 1 (hereinafter referred to as "Case2").

As illustrated in FIG. 4A, when using a probe of the related example in which the reflector 140 is not provided, Case 1 is not distinguished from Case 2. However, as illustrated in FIG. 4B, since a signal reflected by the reflector 140 exhibits the same peak in Case 1 in which the distances D1, D2, and D3 are different, Case 1 may be distinguished from Case 2 in the reflected signals. This is because a path of the signal reflected by the reflector 140 is constant, irrespective of the distance between the probe 100 and the analysis sample TS.

Accordingly, in the example embodiment, a first peak time PT1 may be calculated as described above with reference to FIGS. 3A and 3B using the signal reflected by the reflector 140 as a reference, and a distance $d_S$ between the detector 120 the analysis samples TS may be calculated from the calculated first peak time PT1.

Figure 5:
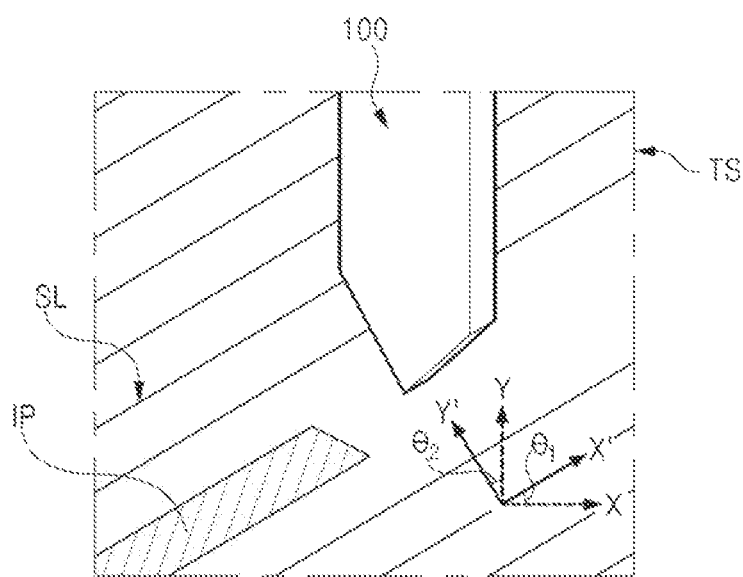
FIG. 5 is a diagram illustrating an imaging method of an image generation device in a near-field detecting system according to example embodiments.

FIG. 5 is a diagram illustrating an imaging method of an image generation device in a near-field detecting system according to example embodiments.

FIG. 5 illustrates an example image of an analysis sample TS captured by an image generation device 300 (see FIG. 1) of a near-field detecting system, and an axis of coordinates for describing a coordinate conversion method is further displayed on the example image.

The image generation device 300 may image a probe 100 and an analysis sample TS together. The image generation device 300 may image patterns in the analysis sample TS, for example, scribe lines SL and an irregular pattern IP. The scribe line SL may be a pattern for confirming coordinates on the analysis sample TS. Therefore, any pattern, other than the scribed line, may be used as long as it is able to identify a coordinates on the analysis sample TS. The irregular pattern IP may be a pattern for confirming a specific position in the analysis sample TS. Accordingly, for example, a pattern in which a specific position is able to be recognized, such as a pattern of a test element group (TEG) of a semiconductor chip, may be used.

As illustrated in FIG. 5, an image coordinates X-Y, that is a plane coordinates, may be identified on a captured image, and a sample coordinates X'-Y', that is a plane coordinates of the analysis sample TS, may be identified using the scribe line SL in the analysis sample TS. The image coordinates X-Y and the sample coordinates X'-Y' may be different from each other by predetermined angles θ1 and θ2. A conversion relationship between the image coordinates X-Y and the sample coordinates X'-Y' may be identified to calculate the sample coordinates X'-Y' from the image coordinates X-Y. Accordingly, a position of the probe 100 on the analysis sample TS may be identified using an image obtained from the image generation device 300.

Figure 6:
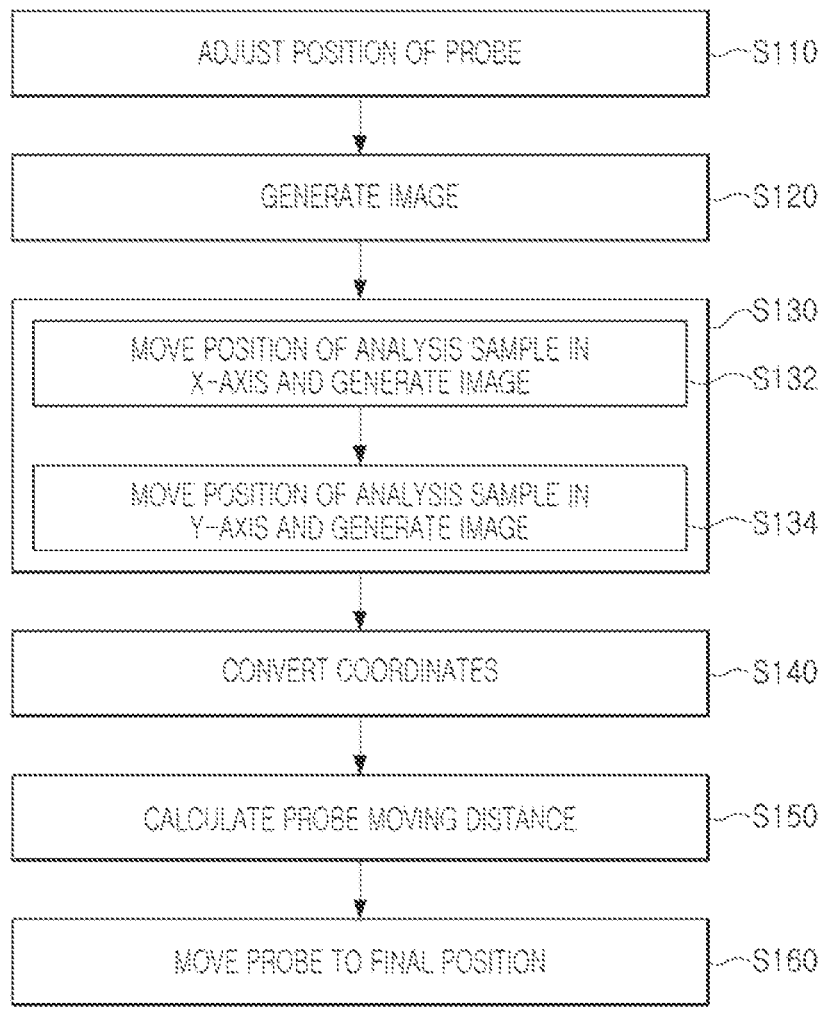
FIG. 6 is a diagram illustrating a method of determining a position of a probe on a plane in a near-field detecting system according to example embodiments.

FIG. 6 is a diagram illustrating a method of determining a position of a probe on a plane in a near-field detecting system according to example embodiments.

Referring to FIG. 6, a method of determining a position of a probe on a plane in a near-field detecting system may include adjusting a position of a probe 100 (S110), generating an image using an image generation device 300 (S120), generating an image while moving a position of an analysis sample TS (S130), converting an image coordinates X-Y into a sample coordinates X'-Y' (S140), calculating a moving distance of the probe 100 (S150), and moving the probe 100 to a final position (S160).

The operation of adjusting a position of a probe 100 (S110) may be an operation of moving the probe 100 to a measurement position for the analysis sample TS, for example, an analysis region. The operation of generating an image using an image generation device 300 (S120) may be an operation of imaging the probe 100 and the analysis sample TS in a corresponding position at a titled angle.

The operation of generating an image while moving a position of the analysis sample TS (S130) may include an operation of moving the analysis sample TS in an X-axis and a Y-axis and an operation of generating an image again in the moved position using the image generation device 300 (S132 and S134). The operation S130 may include both the operations S132 and S134, or may include at least one of the operations S132 and S134. The operation of converting an image coordinates X-Y into a sample coordinates X'-Y' (S140) may be an operation of performing coordinate conversion and error calculation using the image coordinates X-Y and the sample coordinates X'-Y' obtained in the operation S130. In operation S140, for example, calculation and correction may be performed using software. In example embodiments, the two operations S130 and S140 may be repeatedly performed two or more times to improve accuracy.

The operation of calculating a moving distance of the probe 100 (S150) may be an operation of calculating a distance, at which the probe 100 should be moved to be closest to a measurement position, based on the calculation in the operation S140. The operation of moving the probe 100 to a final position (S160) may be an operation of transmitting a control signal to a controller 500 (see FIG. 1) according to the calculated distance to finally move a position of the analysis sample TS. The probe 100, other than the analysis sample TS, may be moved according to example embodiments.

As described above, in the near-field detecting system according to example embodiments, a distance between the probe 100 and the analysis sample TS in a Z direction may be determined using the reflector 140, and relative positions of the probe 100 and the analysis sample TS in the X direction and the Y direction may be determined using the image generation device 300, precision of the measurement position in a three-dimension of the probe 100 may be improved.

Figure 7:
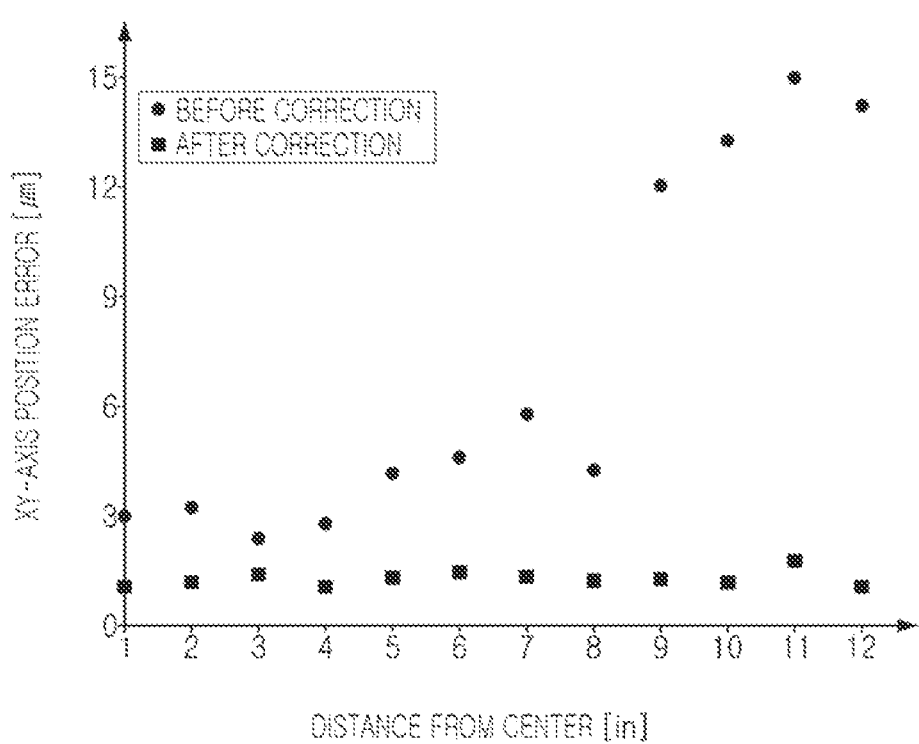
FIG. 7 is a diagram illustrating a correction result of a position of a probe on a plane in a near-field detecting system according to example embodiments.

FIG. 7 is a diagram illustrating a correction result of a position of a probe on a plane in a near-field detecting system according to example embodiments.

Referring to FIG. 7, position error measurement results of an X-axis and a Y-axis depending on a distance from a center of a wafer, an analysis sample TS, before and after position correction, are illustrated. Before correction, a position error is relatively large, and about 3 μm or more. In particular, an error of about 12 μm or more, and a maximum error of about 15 μm occurs in an external region in which the distance from the center of the wafer is large. However, as a result of position correction using the method described above with reference to FIGS. 5 and 6 according to example embodiments, a position error is reduced to about 2 μm or less, and about 1 μm in the entire region of the analysis sample TS. In addition, a uniform error occurs in the entire region including the external region of the wafer.

According to example embodiments, as described above, a reflector may be disposed in a probe to provide a probe for detecting a near field having improved position measurement precision, and a near-field detecting system including the same.

While example embodiments have been shown and described above, it will be apparent to those skilled in the art that modifications and variations could be made without departing from the scope as defined by the appended claims and their equivalents.

What is claimed is:

1. A probe configured to detect a near field, the probe comprising:
   a probe substrate having a tip region at an end portion of the probe substrate, a width of the tip region being less than a width of a remaining region of the probe substrate;
   a first electrode and a second electrode disposed on a surface of the probe substrate, the first electrode and the second electrode being spaced apart from each other and extending from the tip region along the probe substrate;
   an emitter and a detector disposed between the first electrode and the second electrode, the emitter and the detector being spaced apart from each other in a direction in which the probe substrate extends, and being configured to be photo switched; and
   a reflector disposed above the emitter and the detector in the direction in which the probe substrate extends opposite to the tip region, and configured to reflect an electromagnetic wave emitted from the emitter.

2. The probe of claim 1, wherein the emitter, the detector, and the reflector are disposed on a same axis in the direction in which the probe substrate extends.

3. The probe of claim 2, wherein the emitter, the detector, and the reflector are disposed in an order of the detector, the emitter, and the reflector from the tip region.

4. The probe of claim 1, wherein the reflector is configured to obtain a distance between an analysis sample and the detector.

5. The probe of claim 1, wherein each of the emitter and the detector includes a region in which a laser is irradiated.

6. A near-field detecting system comprising:
   a probe configured to emit an electromagnetic wave to an analysis sample and to detect a near field reflected from the analysis sample;
   a spectroscope connected to the probe and configured to measure an electromagnetic wave detected by the probe;
   an image generation device disposed on a side of the probe and configured to image the probe and the analysis sample;
   at least one processor configured to implement:
      an analyzer connected to the spectroscope and the image generation device and configured to analyze information provided from the spectroscope and information provided from the image generation device; and
      a controller configured to adjust a position of the analysis sample based on a control signal from the analyzer; and
   a laser source configured to radiate a laser to the probe,
   wherein the probe comprises:
      a probe substrate;
      a detector and an emitter sequentially disposed from a lower portion of the probe substrate in a direction in which the probe substrate extends, the detector and the emitter being configured to be photo switched; and a reflector disposed above the emitter in the direction in which the probe substrate extends, and configured to reflect an electromagnetic wave emitted from the emitter.

7. The near-field detecting system of claim 6, wherein the analyzer is further configured to analyze a distance between the analysis sample and the probe in a first direction, perpendicular to a surface of the analysis sample, based on the reflector, and analyze a position of the analysis sample in a second direction and a third direction, parallel to the surface of the analysis sample, based on the image generation device.

8. The near-field detecting system of claim 6, wherein the image generation device is further configured to image a surface of the analysis sample at a tilted angle.

9. The near-field detecting system of claim 8, wherein the analyzer is further configured to obtain plane coordinates of the analysis sample to correct a position of the analysis sample by the controller.

10. The near-field detecting system of claim 9, wherein the analyzer is further configured to analyze a relationship between plane coordinates in an image that is captured by the image generation device and the plane coordinates of the analysis sample, to obtain the plane coordinates of the analysis sample based on the plane coordinate in the image.

11. The near-field detecting system of claim 8, wherein the image generation device is further configured to image an irregular pattern and a scribe line included in the analysis sample.

12. The near-field detecting system of claim 6, wherein the laser source is configured to radiate the laser to the emitter and the detector.

13. The near-field detecting system of claim 6, wherein the analyzer is further configured to obtain a distance between the analysis sample and the probe based on a signal of the electromagnetic wave emitted from the emitter and reflected from the analysis sample and the reflector, respectively.

14. The near-field detecting system of claim 13, wherein the analyzer is further configured to obtain physical properties of the analysis sample based on the signal of an electromagnetic wave emitted from the emitter and reflected from the analysis sample.

15. A near-field detecting system comprising:
a probe configured to detect a near field reflected from an analysis sample;
a spectroscope connected to the probe and configured to measure an electromagnetic wave detected from the probe;
at least one processor configured to implement:
an analyzer connected to the spectroscope and configured to analyze information from the spectroscope; and
a controller configured to adjust a position of the analysis sample based on a control signal from the analyzer,
wherein the probe comprises:
an emitter configured to emit an electromagnetic wave vertically;
a detector configured to detect an electromagnetic wave; and
a reflector configured to reflect an electromagnetic wave, emitted from the emitter, toward the detector.

16. The near-field detecting system of claim 15, wherein the emitter, the detector, and the reflector are disposed on a same axis in a direction in which the probe extends.

17. The near-field detecting system of claim 16, wherein the detector is disposed on a first side of the emitter and spaced apart from the emitter, and
wherein the reflector is disposed a second side of the emitter that is different from the first side and spaced apart from the emitter.

18. The near-field detecting system of claim 15, wherein the analyzer is further configured to analyze a signal delayed by the reflector to obtain a distance between the analysis sample and the probe, and
wherein the controller is further configured to adjust the distance between the analysis sample and the probe based on the control signal from the analyzer.

19. The near-field detecting system of claim 15, further comprising:
an image generation device disposed on a side of the probe and configured to image the probe and the analysis sample.

20. The near-field detecting system of claim 19, wherein the analyzer is further configured to analyze information from the image generation device, and
wherein the controller is further configured to adjust a position of the probe on a plane based on the control signal from the analyzer.

* * * * *